United States Patent [19]
Wells et al.

[11] Patent Number: 6,098,666
[45] Date of Patent: Aug. 8, 2000

[54] DUAL COIL TUBING ASSEMBLY

[75] Inventors: Jesse D. Wells, Louisville; Andrew C. Brunn, Windham, both of Ohio

[73] Assignee: Parker-Hannifin Corporation, Cleveland, Ohio

[21] Appl. No.: 09/231,388

[22] Filed: Jan. 13, 1999

Related U.S. Application Data
[60] Provisional application No. 60/074,573, Feb. 13, 1998.

[51] Int. Cl.[7] ....................................... F16L 11/00
[52] U.S. Cl. ........................... 138/115; 138/118
[58] Field of Search ................... 138/115, 114, 138/109, 122, 129, 116, 117, 118, 153, 172

[56] References Cited

U.S. PATENT DOCUMENTS

| | | | |
|---|---|---|---|
| 2,624,366 | 1/1953 | Pugh ........................................ | 138/115 |
| 3,245,431 | 4/1966 | Coe . | |
| 3,487,858 | 1/1970 | Hanback ................................. | 138/118 |
| 3,540,486 | 11/1970 | Flounders . | |
| 3,554,237 | 1/1971 | Pelley ..................................... | 138/153 |
| 3,977,440 | 8/1976 | Pillippi . | |
| 4,009,734 | 3/1977 | Sullivan . | |
| 4,251,907 | 2/1981 | Bleckmann et al. ..................... | 138/172 |
| 4,273,070 | 6/1981 | Hoefelmayr . | |
| 4,399,319 | 8/1983 | Zinn . | |
| 4,518,196 | 5/1985 | Firster et al. . | |
| 4,653,541 | 3/1987 | Oehlschlaeger et al. . | |
| 4,778,977 | 10/1988 | Bleckman . | |
| 5,027,864 | 7/1991 | Conti et al. . | |
| 5,036,891 | 8/1991 | Vogelsang . | |
| 5,232,645 | 8/1993 | Ramos, Jr. . | |

(List continued on next page.)

FOREIGN PATENT DOCUMENTS 2 239 503  7/1991  United Kingdom .

OTHER PUBLICATIONS

Parker Fluid Connectors Catalog 4660 for Parflex Thermoplastic Hose, Tubing, Fittings and Accessories, dated Dec. 1993.
Parker Fluid Connectors Bulletin 4452–B14 for Parker Brake Coil, Tractor/Trailer Coiled Air Brake Hose Assemblies, dated Jan. 1979.
Parker Fluid Connectors Bulletin 4452–B16 for Duo–Coil Tractor/Trailer Coiled Air Brake Assembly, dated Jan. 1994.
Undated literature for Tectran's Magnum Dual–Line Armorcoil System.

*Primary Examiner*—Andres Kashnikow
*Assistant Examiner*—Davis Hwu
*Attorney, Agent, or Firm*—John A. Molnar, Jr.

[57] ABSTRACT

A tubing assembly for conveying fluid under pressure such as from a source of air pressure in a vehicle to an airbrake system of the vehicle. The assembly includes a flexible first and second tubing member, each having an outer surface and extending axially from a forward distal end to a rearward distal end. The first tubing member is wound intermediate the forward and the rearward distal end thereof radially about a generally cylindrical surface to define a first expandable, self-retracting coil portion having a plurality of first turns. The second tubing member, in turn, is wound intermediate the forward and the rearward distal end thereof radially about the cylindrical space to define a second expandable, self-retracting coil portion disposed within the curve of the cylindrical surface space as extending parallel to the first coil portion and as having a plurality of second turns. With each of the second turns of the second coil portion being disposed adjacent a corresponding one of the first turns of the first coil portion, a unitary sheathing member is provided to commonly surround the first and the second tubing members as extending intermediate the forward and the rearward distal ends thereof. As surrounded by the sheathing member, each of the second turns of the second coil portion is thereby paired for mutual axial movement with a corresponding one of the first turns of the first coil portion as the first and the second coil portion are extended and retracted.

11 Claims, 4 Drawing Sheets

U.S. PATENT DOCUMENTS

| | | |
|---|---|---|
| 5,236,016 | 8/1993 | Vogelsang . |
| 5,358,011 | 10/1994 | Stockton et al. . |
| 5,392,374 | 2/1995 | Gorlan et al. . |
| 5,450,703 | 9/1995 | Fuhrman et al. . |
| 5,501,840 | 3/1996 | Mantovani et al. . |
| 5,918,640 | 7/1999 | Orcutt ................................. 138/109 |
| 5,975,144 | 11/1999 | Akedo et al. ...................... 138/172 |

Fig. 5

DUAL COIL TUBING ASSEMBLY

RELATED CASES

The present application claims priority to U.S. Provisional Application Ser. No. 60/074,573 filed Feb. 13, 1998.

BACKGROUND OF THE INVENTION

The present invention relates broadly to tubing assembly for conveying fluid under pressure, and more particularly to a dual coil tubing construction for supplying air pressure within a vehicle from a source of air pressure of the vehicle to the airbrake system of the vehicle.

Current tractor/trailer rigs conventionally are equipped with pneumatically-operated emergency brakes in addition to usual service airbrakes. In basic operation, and as is further described in U.S. Pat. No. 5,232,645 and U.K. Patent Application GB 2,239,503, pressurized air is supplied from the truck unit to the trailer unit, which may be articulated, for the actuation of the emergency and service brake systems of the trailer. Within the emergency brake system, the braking mechanism normally is released under the condition of a constant air pressure supply. The service brake system, however, is manually actuated with pressurized air being supplied to the breaking mechanism upon the application of the brake pedals by the operator.

Pressurized air from the truck to the trailer unit, or between trailer units in tandem rigs, may be supplied via flexible tubing or hose, with separate, dedicated lines being provided for the independent operation of the emergency and service brake systems. Performance requirements for airbrake tubing generally are subject to certain governmental or industry regulations promulgated to ensure the safe operation of the vehicle. In this regard, airbrake tubing conventionally is constructed as having tubular core which optionally may be surrounded, in certain tubing types, by one or more layers of a braided or other wound reinforcement. The core tube may be a thermoplastic material such as a polyamide, polyolefin, polyvinyl chloride, or polyurethane, or a synthetic rubber material such as Buna N or neoprene, with the optional reinforcement preferably being a nylon, polyester, or aramid filament or yarn. For increased abrasion resistance, the core tube and, as the case may be, reinforcement typically are covered with an outer jacket which may be formed of the same or different material as the core tube, but preferably is formed of more abrasion-resistance polymeric material which may be a polyamide, polyolefin, polyvinyl chloride, or polyurethane. A representative airbrake tubing construction is described in U.S. Pat. No. 3,977,440. Commercial tubing of such type is manufactured and sold by the Parflex Division of Parker-Hannifin Corp., Ravenna, Ohio.

For spanning the distance between the tractor and trailer units, or between the trailer units in tandem rings, the airbrake tubing may be preset in its manufacture into a generally helical coil which is both expandable and self-retracting, i.e., recoiling. Such coil utilizes the hysteresis or inherent elastic memory of the tubing to enable the tubing to compactly span varying distances while eliminating the need for reels or counterbalancing equipment. In a typical construction, a length of tubing is wound as having a generally central coil portion which extends intermediate the distal ends of the tubing length. Into each of the tubing ends a fitting may be received as configured for a threaded or other engagement with a corresponding coupling mounted on the tractor or trailer unit. Generally linear terminal portions or "pigtails" also may be provided at either end of the tubing to facilitate the connection of the tubing fittings to the corresponding coupling on tractor and/or trailer. Depending upon the relative orientations of these couplings, the tubing tails each may be disposed parallel or perpendicular to the central longitudinal axis of the coil to minimize stresses as the coil is placed in tension.

Representative airbrake and other coil tubing assemblies are shown in U.S. Pat. Nos. 3,3,977,440; 4,009,734; and 5,232,645; and in U.K. Patent Application 2,239,503. Commercial brakecoil assemblies are manufactured and sold by the Parflex Division of Parker-Hannifin Corp. and by Tectran, Inc., Mississauga, ON.

As separate, usually color-coded, coil tubing assemblies generally must be provided for the individual service and emergency supplies, proposals have been made for consolidating the assemblies into a more manageable and neater package. In this regard, a dual-line system is marketed by Tectran under the tradename "Magnum." Such system includes a pair of parallel tubing members each formed as including a thin polyurethane outer layer in addition to the conventional jacket. The parallel tubes are first passed through a hot air bonded or the like to melt the jacket along an interface line to thereby bond or fuse the tubes together. The fused tubes then are wound over a heated mandrel or the like to form a pair of mutually parallel and self-retracting coils.

Another dual-coil arrangement is marketed by the Parflex Division of Parker-Hannifin Corp. under the tradename "Duo-Coil." Such arrangement involves the provision of an outer service coil of a first inner diameter, and a reverse-wound emergency coil of a smaller inner diameter configured to be received within the service coil. Clips are provided at each end of the assembly to hold the two coils together.

Linear runs of airbrake lines and other tubing may be bundled using clips, wraps, or harnesses. Other linear multi-tube bundles are shown in U.S. Pat. Nos. 4,653,541 and 5,392,541. The Parflex Division of Park-Hannifin Corp. markets multiple tubing and hose bundles for air supply, beverage dispensing, and other fluid handling applications.

In view of the foregoing, it is apparent that continued improvements in tubing coil assemblies, and particularly in dual-coil assemblies for airbrake applications in tractor-trailer rigs and similar heavy equipment would be well-received by the transportation, construction, and other industries involved. A preferred construction would be economical to manufacture, but also would afford an aesthetically clean and neat appearance in a compact envelope size. Such a construction additionally would be capable of withstanding prolonged exposure to hydrocarbons and other corrosive fluids within rigorous service environments.

BROAD STATEMENT OF THE INVENTION

The present invention is directed to a dual coil tubing assembly particularly adapted for use in supplying air pressure within a vehicle such as a tractor/trailer rig from a source of air pressure of the vehicle to the airbrake system of the vehicle. Such assembly includes first and second tubing members, each of which extends intermediate a pair of distal ends and which may be constructed as having a extruded thermoplastic, preferably nylon, inner layer or core and, optionally, a polyester or other fiber reinforcement braided over the core. A thermoplastic polyurethane or other abrasion resistant material my be extruded over the core and the optional reinforcement as an outer layer or jacket. Both of the tubing members are co-wound, such as over a mandrel or the like, intermediate the distal ends thereof, about a cylindrical surface space such that an inboard side of the second tubing member opposes an inboard side of the first tubing member along a generally helical locus. In this way, and after heating to set the elastic memory of the tubing, a pair of parallel coil portions are developed to be mutually expandable and self-retracting.

In accordance with the precepts of the present invention, a unitary sheathing member, which may be extruded in a layer over the tubing members prior to winding, is disposed commonly about the tubing members as extending intermediate the distal ends thereof from a forward to a rearward limit. The sheathing member, preferably formulated of a polyurethane or other abrasion resistant thermoplastic, has a generally continuous exterior surface and an interior surface which conforms to or otherwise is disposed on a portion of the outer surfaces of the first and second tubing members. In this way, the tubing members are associated in a compact package for a quick and tangle-free connection within the vehicle. Advantageously, the sheathing member is effective to delimit the radial movement of each coil portion relative to the other coil portion as the coils are mutually extended and retracted. That is, although the tubing coils are joined by the sheathing to be mutually expandable and retractable, limited relative movement thereof nonetheless is accommodated to minimize any imposed stresses on the tubing members. The unitary cover, moreover, provides added abrasion resistance for increased durability.

In a preferred embodiment, the tubing members are wound with each of the distal ends thereof spaced a predetermined axial and/or distal from the proximal ends of the corresponding coil portion to define generally linear terminal portions or "pigtails." Into the distal ends of each of the terminal portions further may be received a fitting member for the connection of the end to a corresponding coupling of the vehicle. For added durability, a reinforcement member, such a radially-contracted, oriented polymeric "shrink-wrap" tube or other film, may be disposed over at least a portion of the forward and rearward limits of the sheathing member to minimize shearing stresses which otherwise might be imposed thereon at the openings for the tubing terminal portions.

The present invention, accordingly, comprises the apparatus possessing the construction, combination of elements, and arrangement of parts which are exemplified in the detailed disclosure to follow. Advantages of the invention includes a dual coil tubing assembly construction which is economical to produce, but yet is rugged, durable, and tangle-free, and which provides a compact envelope size and aesthetically clean appearance. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions or planes perpendicular and parallel to the longitudinal central axis of the referenced element. Terminology of similar import other than the words specifically mentioned above likewise is to be considered as being used for purposes of convenience rather than in any limiting sense.

For the illustrative purposes of the discourse to follow, the precepts of the dual coil tubing assembly of the present invention are described in conjunction with its adaptation for installation within a tractor/trailer rig or other like vehicle for supplying air pressure from a source thereof to the airbrake system of the vehicle. In view of the discourse to follow, however, it will be appreciated that aspects of the present invention may find utility in other fluid transport systems, such as for hydraulic, pneumatic, or beverage dispensing applications, involving the use of coiled tubing. Use within those such other systems therefore should be considered to be expressly within the scope of the invention herein involved.

Figure 1:
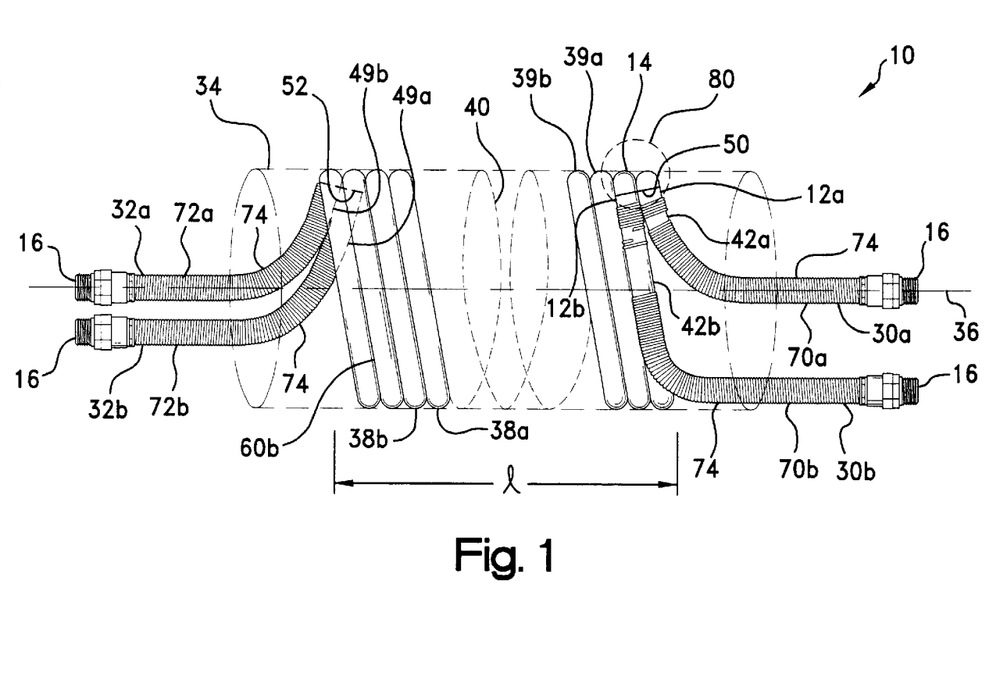
FIG. 1 is a side view of a representative embodiment of a dual coil tubing assembly including a unitary sheathing member in accordance with the present invention.
Figure 2:
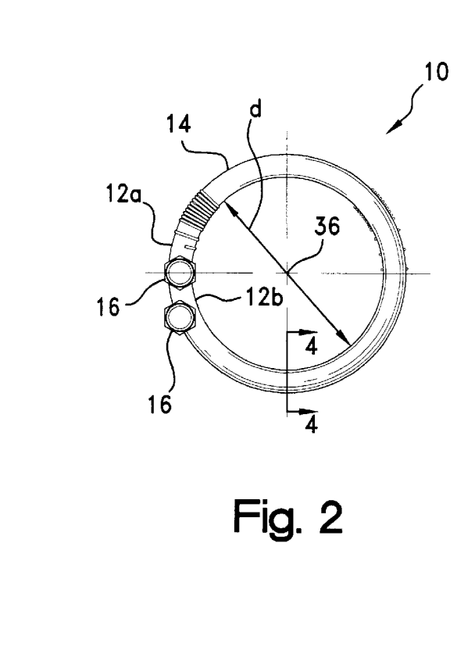
FIG. 2 is an end view of the tubing assembly of FIG. 1.

Referring then to the figures wherein corresponding reference characters are used to designate corresponding elements throughout the several views with equivalent elements being referenced with prime designations, shown generally at 10 in FIGS. 1 and 2 is a representative embodiment according to the present invention of a dual coil airbrake tubing assembly for connection within the airbrake system of a tractor/trailer rig or like vehicle. In basic construction, assembly 10 includes flexible, elongate first and second tubing members, 12a–b, a unitary sheathing member, 14, disposed commonly about the tubing members, and, optionally, pairs of first and second fitting members, collectively referenced at 16, for connection to a corresponding fitting within the vehicle.

Figure 4:
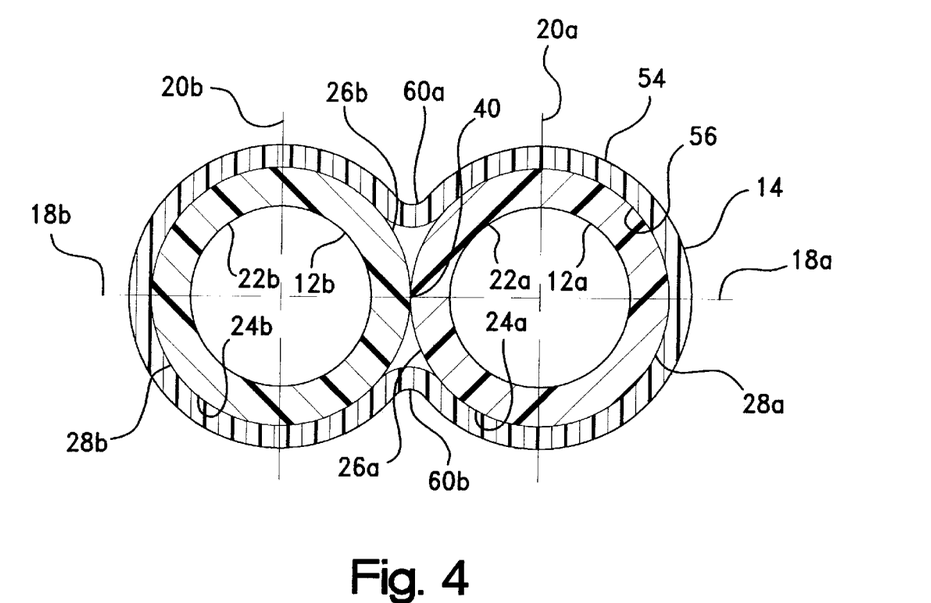
FIG. 4 is an enlarged cross-sectional view through one turn of the dual coil tubing assembly of FIG. 1 taken through line 4—4 of FIG. 2, which line is perpendicular to the longitudinal axis of the assembly;.

As may be seen best in the cross-sectional view of FIG. 4, tubing members 12 each may be conventionally constructed about orthogonal radial axes 18a–b and 20a–b as each having tubular core, 22a–b, which optionally may be surrounded, in certain tubing types, by one or more layers of a braided or other wound reinforcement (not shown). The core tubes, typically having an outer diameter of between about 0.122–0.755 inch (0.310–1.918 cm) and an inner diameter of between about 0.070–0.560 inch (0.178–1.422 cm) to define a wall thickness therebetween of from about 0.020–0.100 inch (0.508–2.54 mm), may be selected for a predetermined working pressure rating as formed of an extruded thermoplastic material such as a polyamide, polyolefin, polyvinyl chloride, or polyurethane, or a synthetic rubber material such as Buna N or neoprene. The optional reinforcement preferably is a nylon, polyester, or aramid filament or yarn. For increased abrasion resistance, the core tube and, as the case may be, reinforcement may be covered with an optional outer jacket (not shown) which may be formed of the same or different material as the core tube, but preferably is formed of a more abrasion-resistance polymeric material, such as a polyamide, polyolefin, polyvinyl chloride, or polyurethane having a wall thickness of between about 0.020–0.060 inch (0.508–1.524 mm). With tubing members 12 disposed in a mutually parallel orientation, the respective outer surfaces, 24a–b, thereof each defines on opposite sectors of axis 20 corresponding arcuate inboard and outboard sides which are designated at 26a–b and 28a–b, respectively.

Returning to FIG. 1, tubing members 12 may be seen to each extend axially from a corresponding forward distal end, 30a–b, respectively, to a corresponding rearward distal end, 32a–b, respectively. Members 12 further are wound intermediate the forward and rearward distal ends 30 and 32 thereof radially about and within the curve of a generally cylindrical surface space, represented in phantom at 34 as extending along a central longitudinal axis, 36, to define a pair of parallel coil portions, 38a–b. Each coil portion 38 may have an indefinite number of turns or convolutions, one of which is referenced at 39a for coil portion 38a and at 39b for coil portion 38b, with the turns of each coil portion being disposed immediately adjacent a corresponding turn of the other coil portion. That is, with the first and second tubing members being disposed such that the second inboard side 26b of second tubing member 12b opposes the first inboard side 26a of first tubing member 12a along the generally helical locus represented in phantom at 40, the second coil portion 38b thereby is formed to be mutually expanding and self-retracting with the first coil portion 38a. It will be appreciated that the cylindrical surface space 34 is defined to be of a given diameter which, in turn, defines the inner diameter, referenced at "d" in FIG. 2, of the coil portions 36. The coil inner diameter d may be of any size, but for most applications will be between about 1.5–4.5 inch (3.81–11.43 cm) as dictated by geometric considerations and/or the bend radius of the particular tubing material employed. So formed, each of the first and second coil portions 38a–b extends along longitudinal axis 36 from a corresponding forward proximal end, 42a–b, to a corresponding rearward proximal end, referenced in phantom at 44a–b. Depending upon the number of turns or revolutions which are formed into the tubing members 12, the respective coil portions 38 thereof may be of any length, but preferably extend, as is represented at "l" in FIG. 1, coterminously along axis 36.

Figure 3:
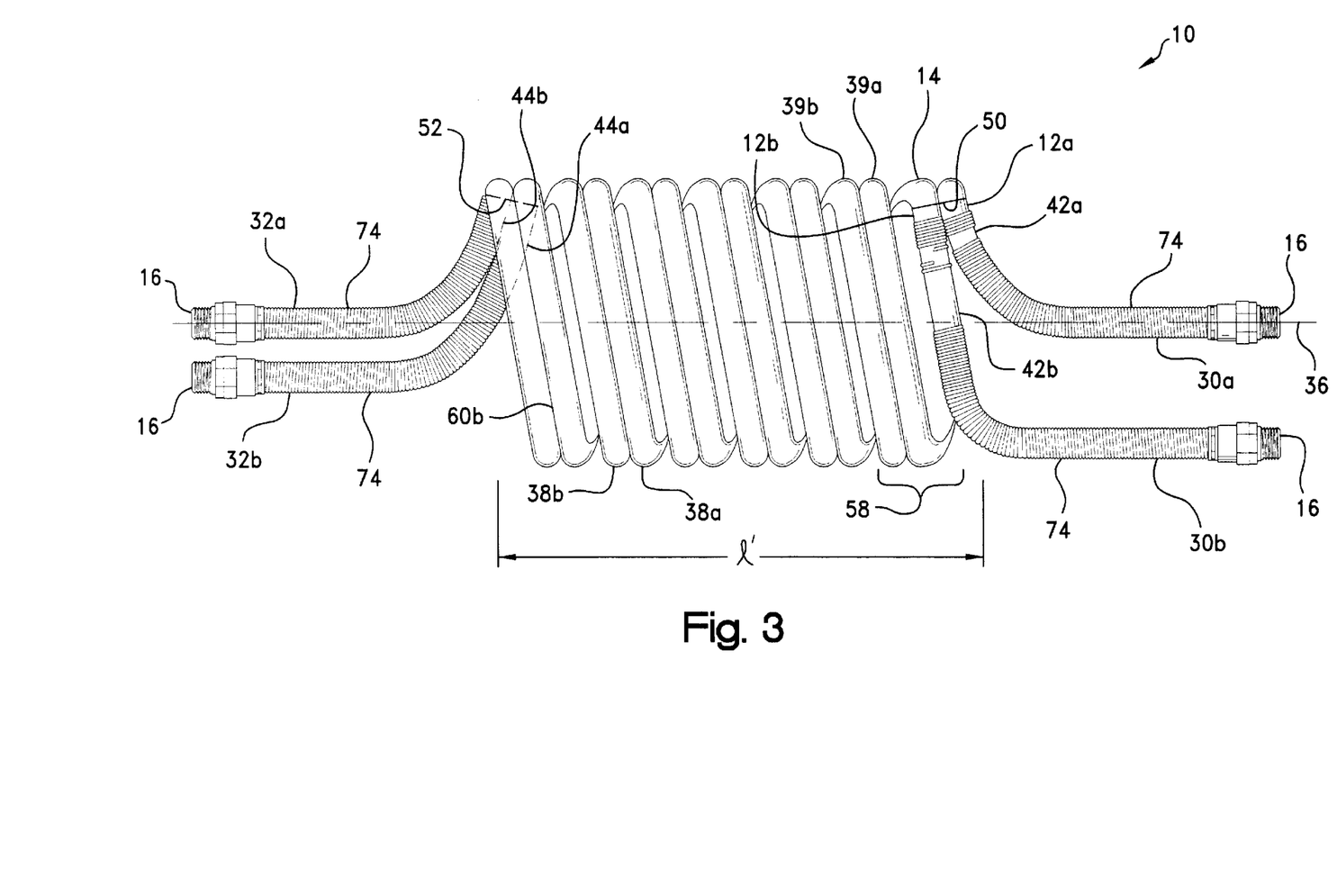
FIG. 3 is a side view showing the dual coil tubing assembly of FIG. 1 in an expanded orientation.

In accordance with the precepts of the present invention, sheathing member 14 is disposed commonly about and surrounding the first and second tubing members 12 as extending intermediate the forward and rearward distal ends thereof from a forward limit, 50, to a rearward limit, referenced in phantom at 52. As may be seen best with reference again to FIG. 4, sheathing member 14 is provided as having a generally continuous exterior surface, 54, and an interior surface, 56, disposed on a portion of the outer surfaces 24 of the tubing members 12. In this regard, and as may be seen with momentary reference to FIG. 3, the provision of sheathing member 14 advantageously consolidates each successive pair, one of which is referenced at 58 for turns 39a–b, of adjacent turns of the individual coil portions 38. Coil portions 38 thereby are provided to respond as an integral unit for the mutual, spring-like extension thereof to an expanded length, referenced at "l'", and subsequent mutual, spring-like retraction to the unexpanded length l shown in FIG. 1.

Figure 5:
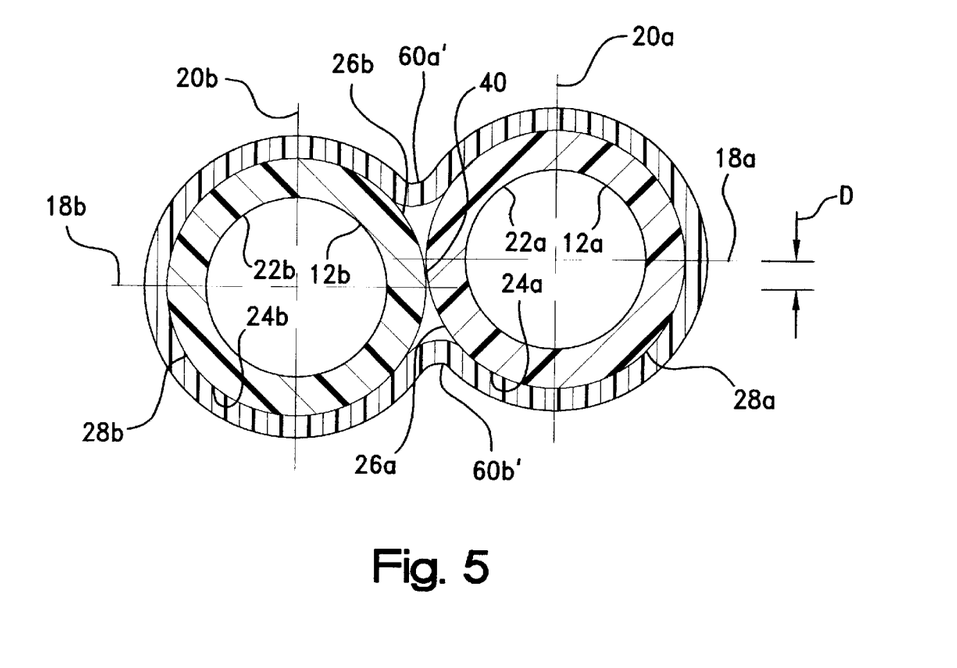
FIG. 5 is an enlarged cross-sectional view as in FIG. 4 illustrating the relative movement of the respective tubing coils as delimited by the sheathing member.

However, and as may be seen in the cross-sectional view of FIG. 5, sheathing member 14 additionally delimits the radial movement of each coil portion 38 relative to the other coil portion as the portions are mutually extended and retracted. That is, in being formed of a relatively thin, i.e., between about 0.005–0.040 inch (0.127–1.016 mm), and flexible layer of, for example, an extruded thermoplastic polyurethane, sheathing member 14 of the invention may be resiliently flexed to accommodate the limited radial movement of the coils, shown by the displacement, referenced at "D," of axes 18. Accordingly, should the tubing members be subjected to unequal torsional or other stresses, those stresses advantageously may be relieved via the flexure mechanism of the sheathing without damage to the tubing. Although an ether-based thermoplastic polyurethane, as is marketed commercially under the tradename "Pellethane" by Dow Chemical Company, Midland, Mi, is preferred for forming sheathing member 14, another polymeric material such as a nylon or other polyamide, polyolefin, polyvinyl chloride, silicone, a fluoropolymer such as polytetrafluoroethylene, or a co-polymer such as ethylene-vinyl acetate may be substituted.

Returning to FIG. 4, in a preferred embodiment, the interior surface 56 of sheathing member 14 may be provided to substantially conform to the outer surfaces 24 of tubing members 12 along the corresponding outboard sides 28 thereof. Further, sheathing member 14 may be provided to partially conform to the inboard surfaces 26 of the tubing members 12 to define an opposing pair of generally V-shaped furrow portions, 60a–b, each of which bridges the first and second tubing members 12 on opposite sides of the helical locus 40. Advantageously, in the preferred embodiment shown, sheathing member 14 imparts a radially compressive force on tubing members 12 such that each of the members abuttingly contacts the other generally along helical locus 40 to minimize the envelope size of the assembly 10. Moreover, and as is shown in FIG. 5 at 60', furrow portions 60 are resiliently yieldable to accommodate the limited radial movement of the tubing members 12.

Returning to FIGS. 1 and 2, in the preferred embodiment shown, assembly 10 further is adapted for installation within a tractor/trailer rig or other vehicle as having a pair of "pigtails" at each end thereof. In this regard, first and second tubing members 12 each are formed as including a generally linear forward portion, 70a–b, respectively, and a generally linear rearward terminal portion, 72a–b. Each of the terminal portions 70 and 72 is defined as extending intermediate a corresponding a distal end 30 or 32 of the associated tubing member 12 and a corresponding proximal end 42 or 44 of the associated coil portion 38. Depending upon the orientation of the mating connections within the vehicle, each of terminal portions 70 and 72 may extend, as is shown, generally parallel to axis 36. Alternatively, one or both pairs thereof may be disposed perpendicularly to axis 36. A protective spring guard or the like, commonly referenced at 74, conventionally may be disposed coaxially about each of the terminal portions 70 and 72.

Figure 6:
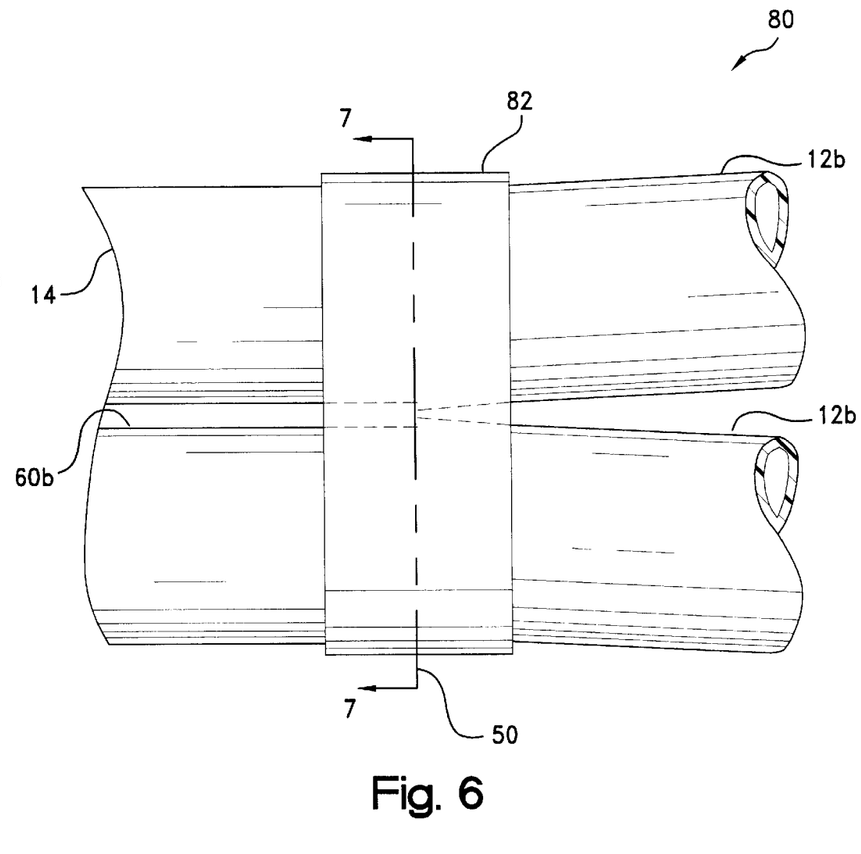
FIG. 6 is an enlarged side view of one end portion of the tubing assembly of FIG. 1 showing the emergence of the tubing members from the sheathing members.
Figure 7:
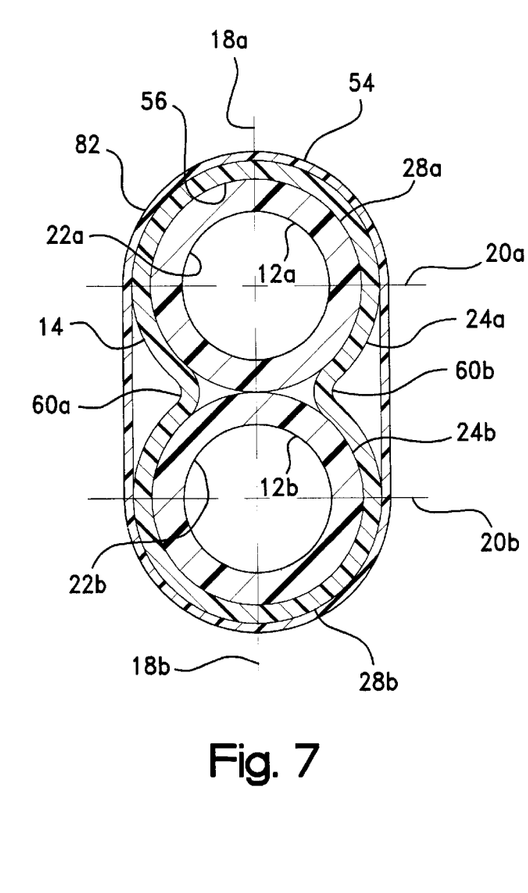
FIG. 7 is a cross-sectional view through the end portion of FIG. 6 taken through line 7—7 of FIG. 6.

Further with respect to the embodiment illustrated in FIGS. 1 and 2, sheathing member 14 is provided to extend intermediate the forward and rearward terminal portions 70 and 72 of tubing members 12 from its forward limit 50 to its rearward limit 52. Preferably, and as may be seen with reference to FIGS. 6 and 7 depicting an enlarged plan (FIG. 6) and cross-sectional (FIG. 7) view of the detail referenced at 80 in FIG. 1, both the forward and rearward limits 50 and 52 of sheathing member 14 are reinforced against tearing or other damage with protective boot. As is shown for forward limit 50, such reinforcement may be provided in the form of a tubular "boot" or section, 82, which is disposed over at least a portion of the corresponding sheathing limit 50 or 52.

Materials suitable for forming tubular section 82 may be selected from any of the known polymeric materials characterized as "heat-shrinkable" including: rubbers such as neoprene and silicone; oriented amorphous or crystalline thermoplastics including polyolefins such as polyethylene, polypropylene, polystyrene, and the like; vinyls such as polyvinyl chloride and polyvinyl acetate; polyamides; fluoropolymers such as polytetrafluoroethylene; polyesters such as polyethylene terephthalate; and copolymers and blends thereof. In general, materials of such type may be cross-linked, oriented, or otherwise residually stressed into an expanded shape, but are sufficiently elastic to contract, constrict, or "shrink" to recover to a pre-expanded shape when raised to a predetermined temperature allowing intra-chain movement and the release of the residual stresses. For example, the material may inherently possess sufficient crystallinity to exhibit the desired thermal response, or may require cross-linking or the addition of another polymer or copolymer to exhibit the desired response. The "shrink" temperature should be above normal room temperature of about 25° C., and typically will be between about 95–225° C.

In a preferred method of manufacture, tubing members 12 are constructed in a conventional manner, and then jointly passed in a parallel arrangement through an extruder die for the formation of the sheathing member 14 which preferably is applied as a melt in a generally continuous, unitary layer to the outer surfaces 24 of the tubing members. Following the application of the sheathing member 14, the construction may be passed through a water bath or the like to effect the cooling of the sheathing member 14. Advantageously, as the sheathing member cools, it is drawn down about the outer surfaces of the tubes to assume the conformal structure shown in FIG. 4.

Next, the tubing with the applied sheathing member may be wound in a helical configuration about a cylindrical mandrel of a select outer diameter, and then cut to a predetermined length leaving a pair of substantially straight, i.e., uncoiled, tubing segments at each end of the tubing helix for forming the terminal pigtail portions 70 and 72 of assembly 10. The segment pairs may be oriented to extend from the last tubing convolution at the corresponding end of the tubing helix in a plane which is generally parallel to the coil axis for forming the assembly configuration depicted in FIG. 1. Alternatively, one or both of the tubing pairs may be oriented to extend from the corresponding helix end in a plane which is disposed normal or at some other angle to the coil axis.

As cut to size, the tubing helix then may be set into a series of abuttingly adjacent, dual tubing coils by utilizing the elastic memory of the tubing. To develop such elastic memory, as is known in the art, the tubing helix may be heated to a predetermined "setting" or glass transition temperature, which may be between about 100–150° C. depending upon the tubing material of construction. The heating may be effected for a predetermined period of time, typically from about 5–90 minutes, by immersing the mandrel and associated tubing coil in a heated water bath or, alternatively, by placing the mandrel and tubing in a dielectric or forced air heater. After cooling, the tubing may be removed from the mandrel and cooled, with the helical coil shape thereof being retained so long at the tubing material is not heated to a temperature above its glass transition temperature, or otherwise is stressed beyond its yield point. The degree of elastic or recoil response exhibited by the dual coil dependent upon the physical properties of the particular tubing material, but generally will be sufficient for the self-retracting response of the coil.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A tubing assembly for conveying fluid under pressure, said assembly comprising:

a flexible, elongate first tubing member extending axially from a first forward distal end to a first rearward distal end, said first tubing member being helically wound intermediate the forward and the rearward distal end thereof radially about a generally cylindrical surface space having a given diameter, a curvature, and a central longitudinal axis to define a first expandable, self-retracting coil portion of an indefinite length having a plurality of first turns, said first coil portion extending axially from a forward to a rearward proximal end thereof along said central longitudinal axis;

a flexible, elongate second tubing member extending axially from a second forward distal end to a second rearward distal end, said second tubing member being helically wound intermediate the forward and the rearward distal end thereof radially about said generally cylindrical surface space to define a second expandable, self-retracting coil portion of an indefinite length disposed within the curvature of said cylindrical surface space as extending parallel to said first coil portion and as having a plurality of second turns each of which is disposed adjacent a corresponding one of the first turns of said first coil portion, said second coil portion extending axially from a forward to a rearward proximal end thereof along said central longitudinal axis; and a unitary sheathing member commonly surrounding said first and second tubing member and extending intermediate the forward and the rearward distal ends thereof such that each of the second turns of said second coil portion is paired for mutual axial movement with a said corresponding one of the first turns of said first coil portion as said first and said second coil portion are extended and retracted, wherein:

said first tubing member includes a first outer surface having an arcuate first outboard side and an arcuate first inboard side, and said second tubing member includes a second outer surface having an arcuate second outboard side and an arcuate second inboard side;

said sheathing member has a generally continuous exterior surface and an interior surface disposed on a portion of the first outer surface of said first tubing member and on a portion of the second outer surface of said second tubing member, the interior surface of said sheathing member substantially conforming to the outer surface of the first tubing member along the first outboard side thereof, and to the outer surface of the second tubing member along the second outboard side thereof; and said sheathing member further substantially conforms to the outer surfaces of said first and said second tubing member along the inboard sides thereof to define a pair of opposing furrow portions bridging said first and said second tubing members, each of said furrow portions being resiliently yieldable to delimit radial movement of each of the second turns of said second coil portion relative to said corresponding one of the first turns of said first coil portion as said first and said second coil portion are extended and retracted.

2. The assembly of claim 1 wherein said sheathing member is formed of a flexible layer of a polymeric material, said layer having a thickness of between about 0.005–0.040 inch (0.127–1.016 mm).

3. The assembly of claim 1 wherein said first tubing member comprises a tubular inner core formed of a polymeric material, said core having an inner and outer diameter defining a wall thickness of between about 0.122–0.755 inch (0.310–1.918 mm) therebetween.

4. The assembly of claim 1 further comprising a pair of first fitting members each attached to a corresponding one of the forward distal ends of said first and said second tubing member, and a pair of second fitting members each attached to a corresponding one of the rearward distal ends of said first and said second tubing members.

5. The assembly of claim 1 further comprising a forward reinforcement member disposed over at least a portion of the forward limit of said sheathing member, and a rearward reinforcement member disposed over at least a portion of the rearward limit of said sheathing member, each said reinforcement member being formed of an oriented, expanded polymeric tube section which is thermally contracted radially about the corresponding limit of said sheathing member to support said sheathing member.

6. A dual coil tubing assembly for supplying air pressure within a vehicle from a source of air pressure in said vehicle to an airbrake system of said vehicle, said assembly comprising:

a flexible, elongate first tubing member extending axially from a first forward distal end to a first rearward distal end, said first tubing member being helically wound intermediate the forward and the rearward distal end thereof radially about a generally cylindrical surface space having a given diameter, a curvature and a central longitudinal axis to define a first expandable, self-retracting coil portion of an indefinite length having a plurality of first turns, said first coil portion extending axially from a forward to a rearward proximal end thereof along said central longitudinal axis;

a flexible, elongate second tubing member extending axially from a second forward distal end to a second rearward distal end, said second tubing member being helically wound intermediate the forward and the rearward distal end thereof radially about said generally cylindrical surface space to define a second expandable, self-retracting coil portion of an indefinite length disposed within the curvature of said cylindrical surface space as extending parallel to said first coil portion and as having a having a plurality of second turns each of which is disposed adjacent a corresponding one of the first turns of said first coil portion, said second coil portion extending axially from a forward to a rearward proximal end thereof along said central longitudinal axis;

a unitary sheathing member commonly surrounding said first and second tubing member and extending intermediate the forward and the rearward distal ends thereof such that each of the second turns of said second coil portion is paired for mutual axial movement with a said corresponding one of the first turns of said first coil portion as said first and said second coil portion are extended and retracted;

a pair of first fitting members each attached to a corresponding one of the forward distal ends of said first and said second tubing member, each of said first fitting members being configured to be couplable to the source of air pressure in said vehicle; and a pair of second fitting members each attached to a corresponding one of the rearward distal ends of said first and said second tubing members, each said second fitting members configured to be couplable to the brake system of said vehicle, wherein:

said first tubing member includes a first outer surface having an arcuate first outboard side and an arcuate first inboard side, and said second tubing member includes a second outer surface having an arcuate second outboard side and an arcuate second inboard side;

said sheathing member has a generally continuous exterior surface and an interior surface disposed on a portion of the first outer surface of said first tubing member and on a portion of the second outer surface of said second tubing member, the interior surface of said sheathing member substantially conforming to the outer surface of the first tubing member along the first outboard side thereof, and to the outer surface of the second tubing member along the second outboard side thereof; and said sheathing member further substantially conforms to the outer surfaces of said first and said second tubing member along the inboard sides thereof to define a pair of opposing furrow portions bridging said first and said second tubing members, each of said furrow portions being resiliently yieldable to delimit radial movement of each of the second turns of said second coil portion relative to said corresponding one of the first turns of said first coil portion as said first and said second coil portion are extended and retracted.

7. The assembly of claim 6 wherein said sheathing member is formed of a flexible layer of a polymeric material, said layer having a thickness of between about 0.005–0.040 inch (0.127–1.016 mm).

8. The assembly of claim 6 wherein said first tubing member comprises a tubular inner core formed of a polymeric material, said core having an inner and outer diameter defining a wall thickness of between about 0.122–0.755 inch (0.310–1.918 mm) therebetween.

9. A tubing assembly for conveying fluid under pressure, said assembly comprising:

a flexible, elongate first tubing member extending axially from a first forward distal end to a first rearward distal end, said first tubing member being helically wound intermediate the forward and the rearward distal end thereof radially about a generally cylindrical surface space having a given diameter, a curvature, and a central longitudinal axis to define a first expandable, self-retracting coil portion of an indefinite length having a plurality of first turns, said first coil portion extending axially from a forward to a rearward proximal end thereof along said central longitudinal axis;

a flexible, elongate second tubing member extending axially from a second forward distal end to a second rearward distal end, said second tubing member being helically wound intermediate the forward and the rearward distal end thereof radially about said generally cylindrical surface space to define a second expandable, self-retracting coil portion of an indefinite length disposed within the curvature of said cylindrical surface space as extending parallel to said first coil portion and as having a plurality of second turns each of which is disposed adjacent a corresponding one of the first turns of said first coil portion, said second coil portion extending axially from a forward to a rearward proximal end thereof along said central longitudinal axis; and a unitary sheathing member commonly surrounding said first and second tubing member and extending intermediate the forward and the rearward distal ends thereof such that each of the second turns of said second coil portion is paired for mutual axial movement with a said corresponding one of the first turns of said first coil portion as said first and said second coil portion are extended and retracted, wherein:

said first tubing member includes a generally linear first forward terminal portion and a generally linear first rearward terminal portion, each said first terminal portion being defined as extending intermediate a corresponding first distal end of said first tubing member and a corresponding first proximal end of said first coil portion;

said second tubing member includes a generally linear second forward terminal portion and a generally linear second rearward terminal portion, each said second terminal portion being defined as extending intermediate a corresponding second distal end of said second tubing member and a corresponding second proximal end of said second coil portion; and said sheathing member extends intermediate the forward and rearward terminal portions of said first and said second tubing member from a forward limit to a rearward limit.

10. A dual coil tubing assembly for supplying air pressure within a vehicle from a source of air pressure in said vehicle to an airbrake system of said vehicle, said assembly comprising:

a flexible, elongate first tubing member extending axially from a first forward distal end to a first rearward distal end, said first tubing member being helically wound intermediate the forward and the rearward distal end thereof radially about a generally cylindrical surface space having a given diameter, a curvature, and a central longitudinal axis to define a first expandable, self-retracting coil portion of an indefinite length having a plurality of first turns, said first coil portion extending axially from a forward to a rearward proximal end thereof along said central longitudinal axis;

a flexible, elongate second tubing member extending axially from a second forward distal end to a second rearward distal end, said second tubing member being helically wound intermediate the forward and the rearward distal end thereof radially about said generally cylindrical surface space to define a second expandable, self-retracting coil portion of an indefinite length disposed within the curvature of said cylindrical surface space as extending parallel to said first coil portion and as having a having a plurality of second turns each of which is disposed adjacent a corresponding one of the first turns of said first coil portion, said second coil portion extending axially from a forward to a rearward proximal end thereof along said central longitudinal axis;

a unitary sheathing member commonly surrounding said first and second tubing member and extending intermediate the forward and the rearward distal ends thereof such that each of the second turns of said second coil portion is paired for mutual axial movement with a said corresponding one of the first turns of said first coil portion as said first and said second coil portion are extended and retracted;

a pair of first fitting members each attached to a corresponding one of the forward distal ends of said first and said second tubing member, each of said first fitting members being configured to be couplable to the source of air pressure in said vehicle; and a pair of second fitting members each attached to a corresponding one of the rearward distal ends of said first and said second tubing members, each said second fitting members configured to be couplable to the brake system of said vehicle, wherein:

said first tubing member includes a generally linear first forward terminal portion and a generally linear first rearward terminal portion, each said first terminal portion being defined as extending intermediate a corresponding first distal end of said first tubing member and a corresponding first proximal end of said first coil portion, and wherein said second tubing member includes a generally linear second forward terminal portion and a generally linear second rearward terminal portion, each said second terminal portion being defined as extending intermediate a corresponding second distal end of said second tubing member and a corresponding second proximal end of said second coil portion; and said sheathing member extends intermediate the forward and rearward terminal portions of said first and said second tubing member from a forward limit to a rearward limit.

11. The assembly of claim 10 further comprising a forward reinforcement member disposed over at least a portion of the forward limit of said sheathing member, and a rearward reinforcement member disposed over at least a portion of the rearward limit of said sheathing member, each said reinforcement member being formed of an oriented, expanded polymeric tube section which is thermally contracted radially about the corresponding limit of said sheathing member to support said sheathing member.

* * * * *